(12) United States Patent
Molnar et al.

(10) Patent No.: US 9,665,461 B2
(45) Date of Patent: May 30, 2017

(54) OBTAINING APPLICATION PERFORMANCE DATA FOR DIFFERENT PERFORMANCE EVENTS VIA A UNIFIED CHANNEL

(75) Inventors: Ingo Molnar, Kagel (DE); Thomas Gleixner, Uhldingen (DE)

(73) Assignee: Red Hat, Inc., Raleigh, NC (US)

( * ) Notice: Subject to any disclaimer, the term of this patent is extended or adjusted under 35 U.S.C. 154(b) by 584 days.

(21) Appl. No.: 12/631,679

(22) Filed: Dec. 4, 2009

(65) Prior Publication Data
US 2011/0138389 A1     Jun. 9, 2011

(51) Int. Cl.
G06F 3/00        (2006.01)
G06F 11/34       (2006.01)

(52) U.S. Cl.
CPC ...... *G06F 11/3466* (2013.01); *G06F 11/3409* (2013.01); *G06F 2201/86* (2013.01); *G06F 2201/865* (2013.01); *G06F 2201/88* (2013.01); *G06F 2201/885* (2013.01)

(58) Field of Classification Search
CPC ............. G06F 2201/86; G06F 2201/88; G06F 2201/865; G06F 2201/885; G06F 11/3409; G06F 11/3466
See application file for complete search history.

(56) References Cited

U.S. PATENT DOCUMENTS

| | | | |
|---|---|---|---|
| 5,485,574 A | 1/1996 | Bolosky et al. | |
| 5,872,976 A | 2/1999 | Yee et al. | |
| 6,098,169 A * | 8/2000 | Ranganathan | 712/227 |
| 6,163,856 A | 12/2000 | Dion et al. | |
| 6,167,538 A | 12/2000 | Neufeld et al. | |
| 6,341,357 B1 | 1/2002 | Ravichandran | |
| 6,374,369 B1 * | 4/2002 | O'Donnell | 714/38.11 |
| 6,438,512 B1 | 8/2002 | Miller | |
| 6,625,648 B1 | 9/2003 | Schwaller et al. | |
| 6,658,654 B1 | 12/2003 | Berry et al. | |
| 6,671,876 B1 | 12/2003 | Podowski | |
| 6,766,471 B2 | 7/2004 | Meth | |
| 6,792,392 B1 * | 9/2004 | Knight | 702/186 |
| 6,801,940 B1 | 10/2004 | Moran et al. | |
| 6,874,099 B1 | 3/2005 | Balasubramanian et al. | |

(Continued)

OTHER PUBLICATIONS

Corbet, Jonathan, "Dueling Performance Monitors," LWN.net, Dec. 9, 2008, http://lwn.net/Articles/310260/, 4 pages.

(Continued)

*Primary Examiner* — H S Sough
*Assistant Examiner* — Carina Yun
(74) *Attorney, Agent, or Firm* — Lowenstein Sandler LLP (57) ABSTRACT

A system for obtaining performance data for different performance events includes a first application monitoring performance of a second application executing on a computing system. The first application identifies the type of event to be measured with respect to the second application, issues a first system call identifying the type of event, receives an identifier corresponding to the event type, and causes the second application to begin execution. After the execution of the second application is completed, the first application issues a second system call including the identifier corresponding to the event type, and receives a value of a hardware counter corresponding to the event type from an operating system.

18 Claims, 9 Drawing Sheets

(56) References Cited

U.S. PATENT DOCUMENTS

| | | | |
|---|---|---|---|
| 6,901,582 B1 | 5/2005 | Harrison | |
| 6,981,135 B1* | 12/2005 | Trask | 713/1 |
| 7,003,698 B2 | 2/2006 | Glass | |
| 7,020,758 B2 | 3/2006 | Fisk | |
| 7,051,098 B2 | 5/2006 | Master et al. | |
| 7,076,547 B1 | 7/2006 | Black | |
| 7,089,403 B2 | 8/2006 | Pechtchanski et al. | |
| 7,117,501 B2 | 10/2006 | Rosu et al. | |
| 7,228,527 B1 | 6/2007 | Phillips et al. | |
| 7,457,722 B1 | 11/2008 | Shain et al. | |
| 7,890,620 B2 | 2/2011 | Masuda et al. | |
| 8,171,340 B2 | 5/2012 | Molnar | |
| 8,286,192 B2 | 10/2012 | Molnar | |
| 2004/0054850 A1 | 3/2004 | Fisk | |
| 2004/0064552 A1 | 4/2004 | Chong et al. | |
| 2004/0103221 A1 | 5/2004 | Rosu et al. | |
| 2005/0033766 A1* | 2/2005 | Pang et al. | 707/104.1 |
| 2005/0210454 A1 | 9/2005 | DeWitt et al. | |
| 2005/0273858 A1* | 12/2005 | Zadok et al. | 726/24 |
| 2006/0041794 A1 | 2/2006 | Aaron | |
| 2006/0206287 A1 | 9/2006 | Rosam et al. | |
| 2006/0271827 A1* | 11/2006 | Cascaval | G06F 11/3466 714/39 |
| 2007/0006032 A1 | 1/2007 | Sun | |
| 2008/0046725 A1 | 2/2008 | Lo et al. | |
| 2008/0126828 A1 | 5/2008 | Girouard et al. | |
| 2008/0134170 A1 | 6/2008 | Astheimer | |
| 2008/0320109 A1* | 12/2008 | Andrews et al. | 709/220 |
| 2009/0070462 A1 | 3/2009 | Chong et al. | |
| 2009/0217092 A1 | 8/2009 | Weiberle et al. | |
| 2009/0235056 A1* | 9/2009 | Hirai | G06F 11/3419 712/220 |
| 2011/0138146 A1 | 6/2011 | Molnar | |
| 2011/0145829 A1 | 6/2011 | Molnar | |
| 2011/0145838 A1 | 6/2011 | de Melo | |

OTHER PUBLICATIONS

Corbet, Jonathan, "Followups: Performance Counters, ksplice, and fsnotify," LWN.net, http://lwn.net/Articles/311850/, Dec. 17, 2008, 5 pages.

Gleixner, Thomas, "[Announcement] Performance Counters for Linux," LWN.net, http://lwn.net/Articles/310176/, Dec. 4, 2008, 4 pages.

Gleixner, Thomas, "[Patch 2/3] Performance Counters: Documentation," LWN.net, http://lwn.net/Articles/310269/, Dec. 4, 2008, 3 pages.

Molnar, Ingo, "Re: [Patch0/3] [Announcement] Performance Counters for Linux," LWN.net, http://lwn.net/Articles/310274/, Dec. 5, 2008, 2 pages.

Molnar, Ingo, "Performance Counters for Linux, V2," LWN.net, http://lwn.net/Articles/310150/, Dec. 8, 2008, 27 pages.

Molnar, Ingo, "Performance Counters for Linux, V3," LWN.net, http://lwn.net/Articles/310888/, Dec. 11, 2008, 33 pages.

Molnar, Ingo, "Performance Counters for Linux, V4," LWN.net, http://lwn.net/Articles/311388/, Dec. 14, 2008, 38 pages.

Office Action mailed Apr. 4, 2012 for U.S. Appl. No. 12/636,674.

Office Action mailed Mar. 3, 2011 for U.S. Appl. No. 12/636,661.

Office Action mailed Aug. 3, 2011 for U.S. Appl. No. 12/636,661.

Notice of Allowance mailed Dec. 27, 2011 for U.S. Appl. No. 12/636,661.

Notice of Allowance mailed Mar. 1, 2012 for U.S. Appl. No. 12/631,663.

Office Action mailed Jul. 24, 2012 for U.S. Appl. No. 12/636,674.

Office Action mailed May 23, 2012 for U.S. Appl. No. 12/636,670.

Office Action mailed Oct. 19, 2012 for U.S. Appl. No. 12/636,670.

Notice of Allowance mailed Jun. 7, 2012 for U.S. Appl. No. 12/631,663.

Notice of Allowance mailed May 16, 2014 for U.S. Appl. No. 12/636,674.

Office Action mailed Oct. 23, 2013 for U.S. Appl. No. 12/636,670.

Office Action mailed Jun. 3, 2014 for U.S. Appl. No. 12/636,670.

* cited by examiner

OBTAINING APPLICATION PERFORMANCE DATA FOR DIFFERENT PERFORMANCE EVENTS VIA A UNIFIED CHANNEL

RELATED APPLICATION

The present application is related to co-filed U.S. patent application Ser. No. 12/631,663, entitled "Kernel Subsystem for Handling Performance Counters and Events", which is assigned to the assignee of the present application.

TECHNICAL FIELD

Embodiments of the present invention relate to performance monitoring. Specifically, embodiments of the invention relate to a method and system for obtaining performance data for different performance events via a unified channel.

BACKGROUND

Collecting performance-related information during the execution of a program has become an important part of program code optimization. Hardware level monitoring collects information at the micro-architectural level such as the number of instructions executed, the number of cache misses, the number of mis-predicted branches, etc.

Contemporary processors typically include a Performance Monitoring Unit (PMU) that provides support for collecting the above information by exporting a set of programmable counters. However, the PMU can change significantly from one processor implementation to another and sometimes inside the same processor family. For example, in the Itanium® Processor Family, the number of events that can be measured goes from about 200 for Itanium® to about 500 for Itanium® 2. Events with the same name are not necessarily encoded the same way. The width of the counters goes from 32 bits to 47 bits between the two generations of processor. In addition, the functionality of each PMU model may vary greatly. Many PMU models go beyond just providing simple counters, many can capture addresses, latencies and branches for example. Similarly, monitoring tools have very different needs depending on what they measure, from collecting simple system-wide counts to collecting counts for individual tasks across multiple processors. Typically, a monitoring tool can receive desired performance data if it provides a specific ("raw") event code for the PMU of the given target CPU.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for obtaining performance data for different performance events via a unified channel are described herein. In one embodiment, a monitoring application identifies the type of event to be measured with respect to a monitored application, issues a first system call identifying the type of event, and receives an identifier corresponding to the event from the operating system. In one embodiment, the identifier is a file descriptor corresponding to a hardware counter associated with the identified event type. Next, the monitoring application causes the monitored application to begin execution, waits until the execution of the monitored application is completed, and then issues a second system call including the identifier (e.g., the file descriptor) corresponding to the event type. In response to the system call, the monitoring application receives a value of the hardware counter corresponding to the event type from the operating system, and creates a report including the counter value.

Figure 1A:
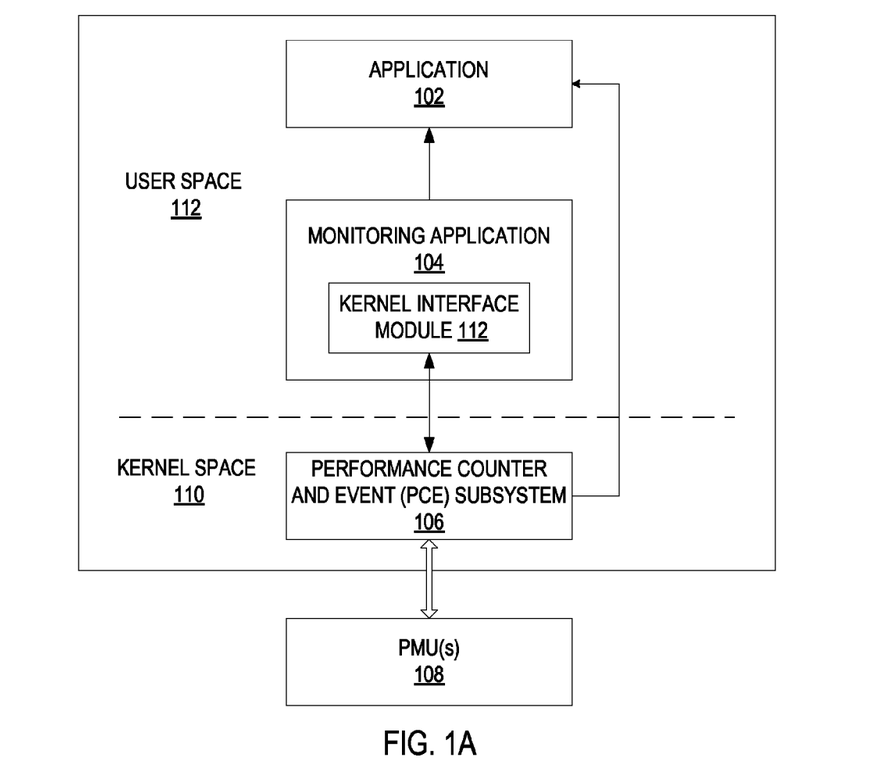
FIG. 1A is a block diagram of one embodiment of a performance monitoring system.

FIG. 1A is a diagram of one embodiment of a performance monitoring system 100 that may be part of a computing system such as a client computer (e.g., a personal computer, a laptop, a PDA, a mobile phone, etc.), a server computer, a gateway computer, etc. System 100 includes a physical memory and one or more processors (CPUs). The physical memory is mapped to virtual memory that is divided into user space 112 and kernel space 110. The kernel space 110 is reserved for running an operating system (e.g., Linux® OS, Windows® OS, etc.). The user space 112 is reserved for user mode applications including applications 102 and 104. Application 102 can be any type of application including, for example, a browser application, web application, a desktop application, etc. Application 104 monitors performance of application 102 by collecting performance characteristics of the application 102 and generating appropriate reports.

Each CPU of the system 100 has a Performance Monitoring Unit (PMU) 108 that exports a set of programmable hardware counters that collect performance-related data such as the number of instructions executed, the number of cache references, the number of cache misses, the number of branch instructions, the number of mis-predicted branches, the number of CPU cycles, the number of bus cycles, etc. These registers can also trigger interrupts when a threshold number of events have passed, and can thus be used to profile the code that runs on that CPU. Depending on the type of CPU, the PMU may export simultaneously a limited number (e.g., 2, 3 or 4) of hardware counters. Also, different function calls may be needed to program hardware counters of PMUs associated with different types of CPU.

The operating system includes a performance counter and event (PCE) subsystem 106 that activates appropriate PMU counters upon receiving a request from the monitoring application 104. The monitoring application 104 does not need to be aware of the CPU type and associated PMU 108. The PCE subsystem 106 provides an abstraction of the PMU hardware capabilities and requirements. In particular, in one embodiment, the monitoring application 104 only needs to identify the type of event to be monitored (e.g., cache accesses, cache misses, branch instructions, mis-predicted branches, CPU cycles, etc.), and the PCE subsystem 106 performs appropriate operations to activate a PMU hardware counter corresponding to the identified event type.

In some embodiments, the PCE subsystem 106 allows the monitoring application 104 to request counters specific to a certain task and/or a particular CPU, keeps track of task switching and/or task migration from one CPU to another during the execution of the application 102, and provides resulting counters to the monitoring application 104. In one embodiment, the PCE subsystem 106 provides "virtual" counters, regardless of the width of the underlying hardware counters.

As will be discussed in more detail below, in some embodiments, the PCE subsystem 106 allows sharing of PMU hardware counters between multiple tasks when multiple tasks are run on the CPU consecutively. Further, in some embodiments, the PCE subsystem 106 allows sharing of PMU hardware counters across multiple event types when the number of event types requested by the monitoring application 104 exceeds the number of available PMU counters.

In one embodiment, the monitoring application 104 includes a kernel interface module 112 that interacts with the PCE subsystem 106. The kernel interface module 112 requests a counter for a specific event type via a single system call that includes the event type as a parameter. This system call returns a file descriptor corresponding to a single hardware counter. The kernel interface module 112 can then use the file descriptor to perform virtual file system (VFS) system calls such as a read system call to obtain the current value of the counter. The initial system call can include an event time period as a parameter to block reads until the counter overflows the given value, allowing, for example, events to be queried in batches of 1000. In some embodiments, multiple counters are kept open at a time and the counters can be accessed using VFS system calls such as select( ), read( ), epoll( ) or any similar calls.

In one embodiment, the kernel interface module 112 includes a task parameter in the initial system call to obtain a counter value for a specific task. In addition, or alternatively, the kernel interface module 112 can include a CPU parameter in the initial system call to restrict monitoring to a specific processor.

By utilizing file descriptors and VFS functionality, interactions between the monitoring application 104 and the PCE subsystem 106 are significantly simplified, and the use of ptrace or similar techniques is avoided, thus reducing the amount of privilege needed by the monitoring application 104 and avoiding perturbing the monitored task by stopping and restarting it.

Figure 1B:
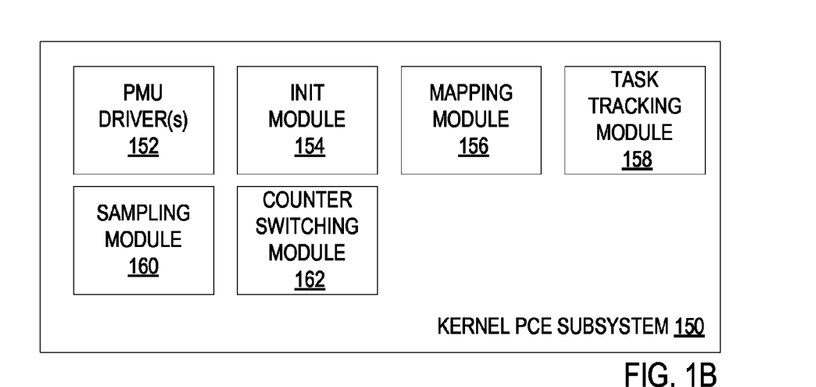
FIG. 1B is a block diagram illustrating a kernel performance counter and event (PCE) subsystem.

FIG. 1B is a block diagram illustrating a kernel PCE subsystem 150. The PCE subsystem 150 may include PMU driver(s) 152, an init module 154, a mapping module 156, a task tracking module 156, a sampling module 160, and a counter switching module 162.

The init module 154 operates during initialization of the operating system. In particular, the init module 154 determines for each processor whether the processor has a PMU, determines the type of the processor, and installs a PMU driver 152 corresponding to the type of the processor. PMU driver 152 provides an interface for the PMU including function calls to activate and deactivate hardware counters for various event types, function calls to setup a sampling register to collect sampling data for the application being monitored, function calls to activate an interrupt flag to raise special interrupts to enable periodic collection of sampling data, etc. The code for function calls in the PMU driver 152 is created based on documentation provided for a specific PMU and other sources such as experimentation results, etc.

The mapping module 156 receives a request of the monitoring application for a specific event type via a designated system call, and invokes the PMU driver 152 to activate a hardware counter pertaining to the specific event type. The mapping module 156 then creates a file descriptor corresponding to the hardware counter and returns the file descriptor to the monitoring application. In one embodiment, if the system call asks for counters on each processor, the mapping module 156 invokes relevant PMU drivers to activate hardware counters on all processors, and creates a file descriptor for each hardware counter. When the mapping module 156 receives a read system call specifying a file descriptor, the mapping module 156 identifies a hardware counter corresponding to the file descriptor, and returns the value of the hardware counter to the monitoring application.

Alternatively, if the monitoring application requests a counter for all processors, the mapping module 156 invokes relevant PMU drivers to activate hardware counters on all processors, allocates a data field for a cumulative counter, and creates a file descriptor for the cumulative counter. When the mapping module 156 receives a read system call specifying this file descriptor, the mapping module 156 returns a cumulative value of the hardware counters on all processors to the monitoring application.

If the monitoring application requests a counter for a specific task, the mapping module 156 invokes the task tracking module 156 that interacts with a task scheduler of the kernel. Based on notifications of the task scheduler, the task tracking module 158 can determine when the execution of a task begins and when the execution of the task ends, and the mapping module 156 can activate and deactivate a corresponding hardware counter accordingly. In addition, the task tracking module 158 may interact with a CPU scheduler of the kernel to detect the CPU switching from one task to another. The mapping module 156 can activate a hardware counter when the CPU starts executing a first task, deactivate this hardware counter when the CPU switches to a second task, and then activate this hardware counter again when the CPU switches back to the first task.

The sampling module 160 provides sampling information when the monitoring program requests sampling. Sampling allows the periodic receipt of current program state while the application or task is running. The current program state may include an instruction pointer (IP) value that specifies the address of where the application is executing at that specific moment. The monitored application may request sampling by specifying a sampling time period in the initial system call. In response, the sampling module 160 sets a sampling register in the PMU using the sampling time period, and activates an interrupt flag in the PMU to raise a special interrupt that is linked to an interrupt handler in the sampling module 160. The sampling module 160 then allocates a buffer to store sampling information, creates a file descriptor corresponding to the buffer and returns the file descriptor to the monitoring application. When an interrupt occurs, the sampling module 160 reads sampling information from the sampling register, and stores the sampling information to a buffer associated with the file descriptor. The monitoring application can obtain the contents of the buffer via a file descriptor read system call.

The counter switching module 162 is invoked when the number of counters requested by the monitoring application exceeds the number of hardware counters available in the PMU. The counter switching module 162 sets a counter scheduler to trigger a timer interrupt at predefined time intervals. Initially, the available hardware counters perform measurements for a first set of requested events, then upon a timer interrupt, the available hardware counters are switched to perform measurements for a second set of requested events, and so on.

Figure 2:
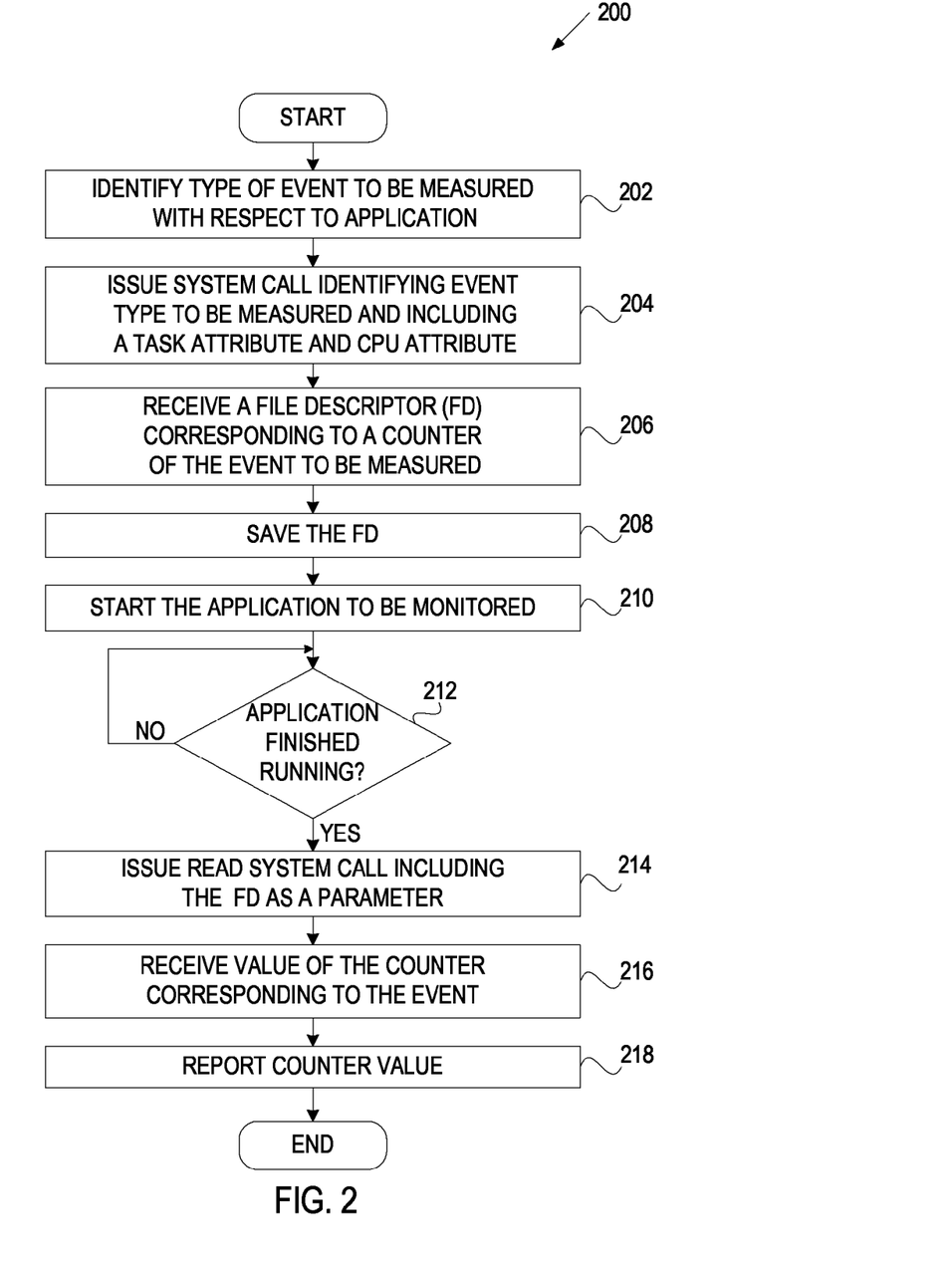
FIG. 2 is a flow diagram of one embodiment of a method for obtaining performance data for different performance events via a unified channel.

FIG. 2 is a flow diagram of one embodiment of a method 200 for obtaining performance data for different performance events via a unified channel. The method 200 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 200 is performed by a monitoring application (e.g., monitoring application 104 of FIG. 1A).

Referring to FIG. 2, method 200 begins with identifying the type of event to be measured with respect to a monitored application (block 202). The event type may be, for example, cache accesses, cache misses, branch instructions, mis-predicted branches, CPU cycles, etc.

At block 204, processing logic issues a system call including a generalized event type as a parameter. For example, the CPU cycles event can have an identifier of 0, the instructions event can have an identifier of 1, the cache references event can have an identifier of 2, the cache misses event can have an identifier of 3, the branch instructions event can have an identifier of 4, the mis-predicted branches event may have an identifier of 5, the bus cycles event may have an identifier of 6, etc. If a CPU is not able to count the selected event, then the system call will return an invalid code message.

If the monitoring application desires to measure an event that does not have a generalized identifier, the monitoring application can request a counter for such an event by including the precise ("raw") event code (e.g., "0x4064") as the event type parameter in the system call and including an indicator which specifies that the event type parameter has the raw event code as opposed to a generalized event type ID.

In one embodiment, the issue call may also include a counter parameter that specifies whether a requested counter is a "counting" counter that counts the number of occurring events or a "sampling" counter that generates an interrupt every N events to collect sampling information. The counter parameter may specify a sampling time interval which will be equal to 0 if the counter is a counting counter or will be greater than 0 if the counter is a sampling counter. For a sampling counter, a record type parameter may be included in the system call to specify what data should be recorded on each interrupt. This data may be recorded to a ring-buffer that is available to the user space.

In one embodiment, the system call includes a task id (pid) as a parameter, which allows the counter to be specific to a task. For example, if the pid parameter is zero, the counter is attached to the current task. If the pid parameter is greater than zero, the counter is attached to a specific task (if the current task has sufficient privilege to do so). If the pid parameter is less than zero, then all tasks should be counted (per cpu counters).

In one embodiment, the system call includes a CPU id (cpu) as a parameter, which allows a counter to be made specific to a CPU. For example, if the cpu parameter is equal to or greater than zero, the counter is restricted to a specific CPU. If the cpu parameter is equal to a negative number, then the counter should count on all CPUs. According to the above examples, if the pid parameter is greater than zero and the cpu parameter equals to a negative number, then the counter should be a per task counter that counts events of that task and "follows" that task to whatever CPU the task gets scheduled to. Per task counters can be created by any user, for their own tasks. If the pid parameter is equal to −1 and the cpu parameter is equal to x, then the counter should be a per CPU counter that counts all events on CPU-x. Such a counter may need an administrator privilege to be provided.

At block 206, processing logic receives a file descriptor (FD) corresponding to a hardware counter of the event to be measured. At block 208, processing logic saves the FD. At block 210, processing logic starts the application to be monitored. At block 212, processing logic determines whether the application finished running. If not, processing block waits until the execution of the application is completed. When the execution of the application is completed, processing logic issues a read system call including the FD as a parameter (block 214). At block 216, processing logic receives the value of the hardware counter corresponding to the FD. At block 218, processing logic reports the counter value. Further, processing logic issues a close FD system call that causes the hardware counter to be deactivated.

As discussed above, multiple counters can be open at a time, and the counters can be polled using a poll system call specifying relevant FDs. For example, a user may request the monitoring application to collect performance statistics of a web browser session (e.g., via a command such as "$ perf stat firefox"). The user may then initiate a web browser session, browse the Internet, and then exit the web browser. An example of the resulting performance counter statistics may be as follows:

| 284647077 | Cycles | 2281.291 M/sec |
| 149399264 | Instructions | 0.525 IPC |
| 10214781 | Cache references | 81.866 M/sec |
| 173344 | Cache misses | 1.389 M/sec |

In this example, four separate hardware counters were started: for the cycles event, the instructions event, the cache-references event, and the cache-misses event. The 'perf stat' monitoring application received four separate FDs from the kernel, e.g., FD 14, 15, 16 and 17. For example, the line "149399264 Instructions 0.525 IPC" was printed after reading from the second FD (value 15). The read( ) system call returned the value 149399264.

Figure 3:
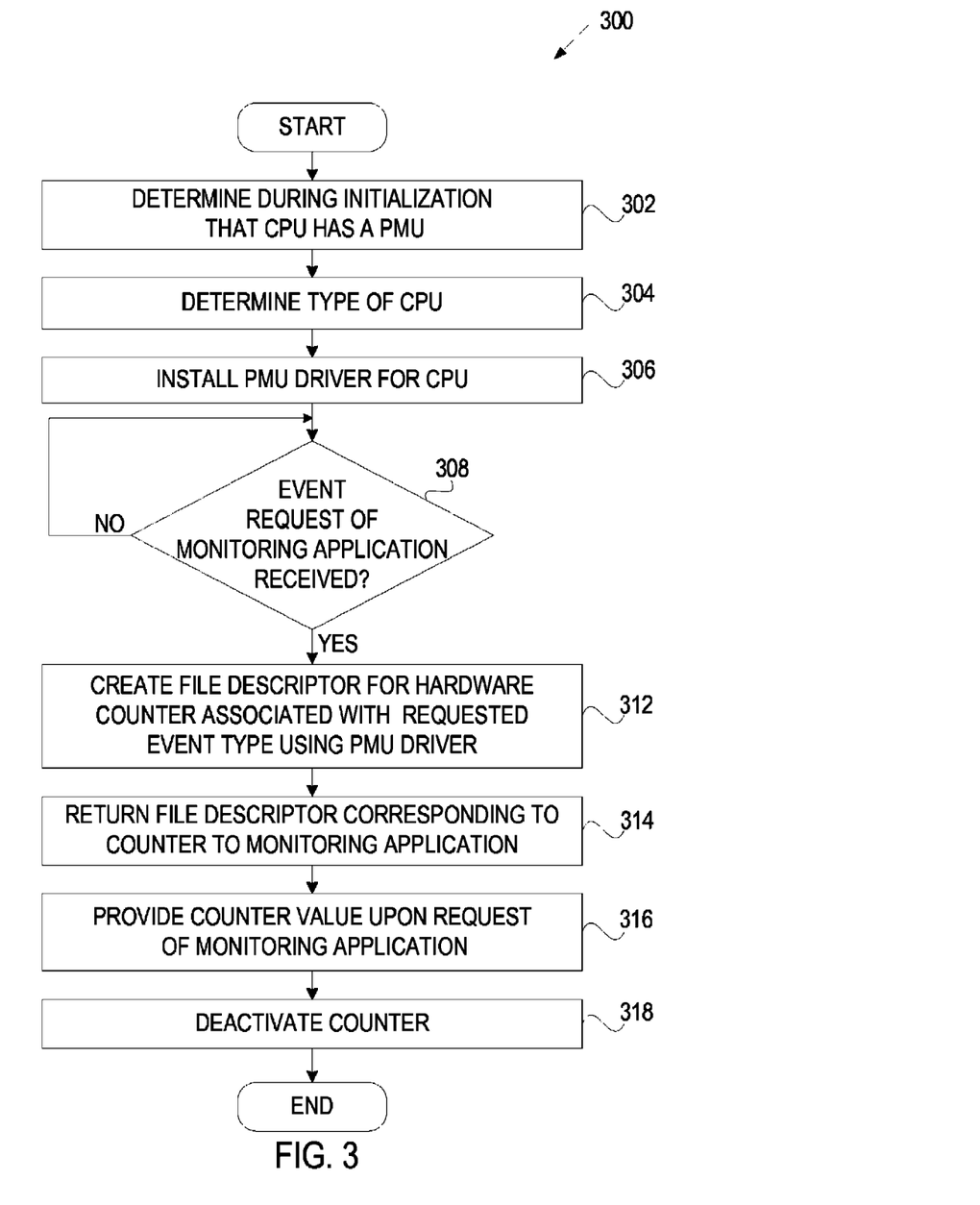
FIG. 3 is a flow diagram of one embodiment of a method for handling performance counters and events.

FIG. 3 is a flow diagram of one embodiment of a method 300 for handling performance counters and events. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a kernel (e.g., kernel PCE subsystem 106 of FIG. 1A).

Referring to FIG. 3, method 300 begins with determining, during initialization of the operating system, that each CPU has a PMU. At block 304, processing logic determines the type of each CPU. At block 306, processing logic installs a PMU driver for each CPU.

Subsequently, processing logic waits for an event request of a monitoring application (block 308). Upon receiving the request of the monitoring application (e.g., via a system call), processing logic uses the PMU driver to activates a hardware counter for the requested event type, and creates a file descriptor corresponding to the for hardware counter (block 312). At block 314, processing logic returns the file descriptor corresponding to the hardware counter to the monitoring application. At block. 316, upon a request of the monitoring application (e.g., via a read FD system call), processing logic provides the hardware counter value to the monitoring application. At block 318, processing logic deactivates the hardware counter.

Figure 4:
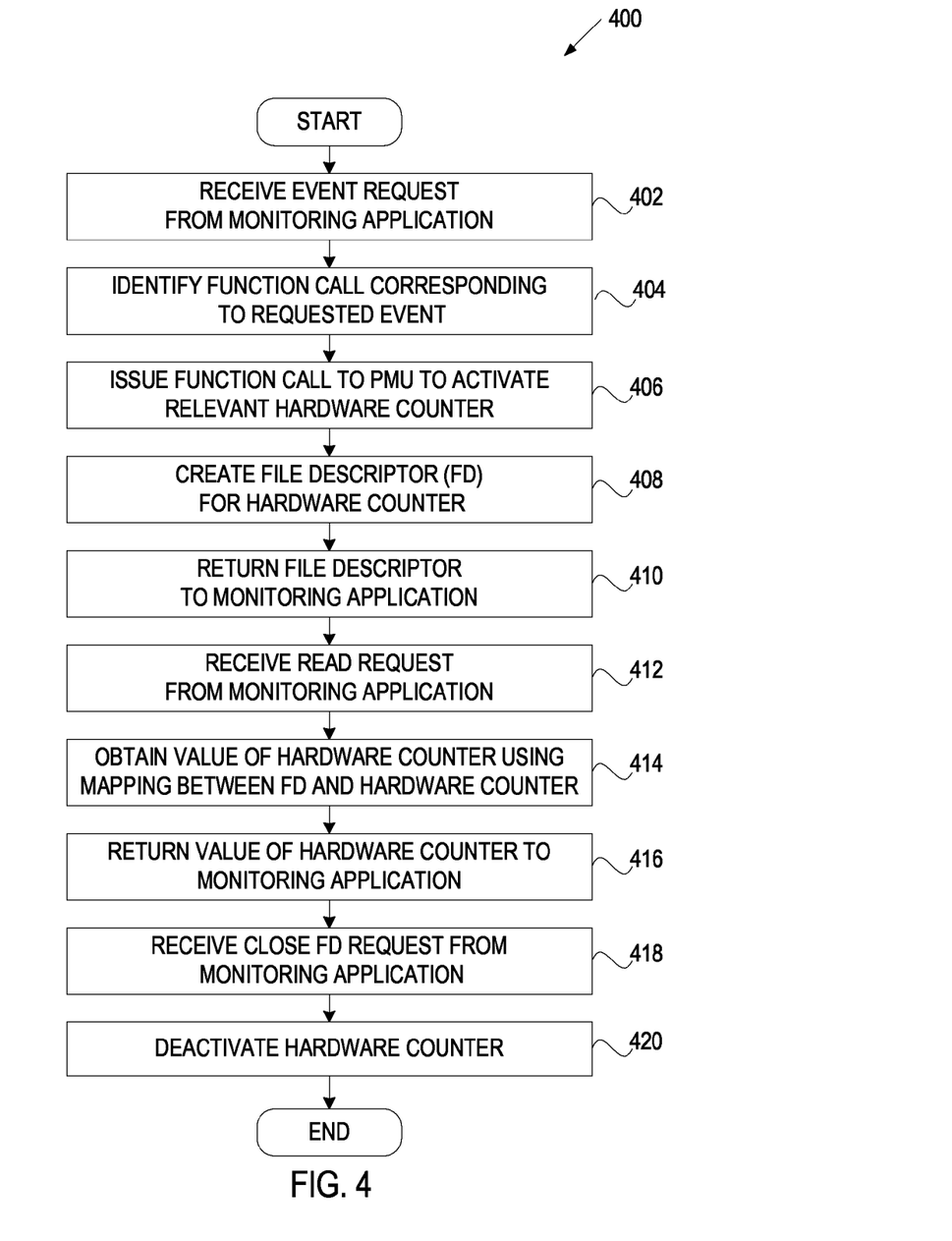
FIG. 4 is a flow diagram of one embodiment of a method for providing an abstraction of hardware counters.

FIG. 4 is a flow diagram of one embodiment of a method 400 for providing an abstraction of hardware counters. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by a kernel (e.g., kernel PCE subsystem 106 of FIG. 1A).

Referring to FIG. 4, method 400 begins with receiving an event request from a monitoring application. At block 404, processing logic identifies a function call corresponding to the requested event. At block 406, processing logic issues the function call to the PMU to activate a relevant hardware counter. At block 408, processing logic creates a file descriptor (FD) for the hardware counter. At block 410, processing logic returns the file descriptor to the monitoring application.

At block 412, processing logic receives a read request from the monitoring application specifying the file descriptor. At block 414, processing logic obtains the value of the hardware counter using the mapping between the file descriptor and the hardware counter. At block 416, processing logic returns the value of the hardware counter to the monitoring application.

At block 418, processing logic receives a close file descriptor request from the monitoring application. At block 420, processing logic deactivates the hardware counter.

Figure 5:
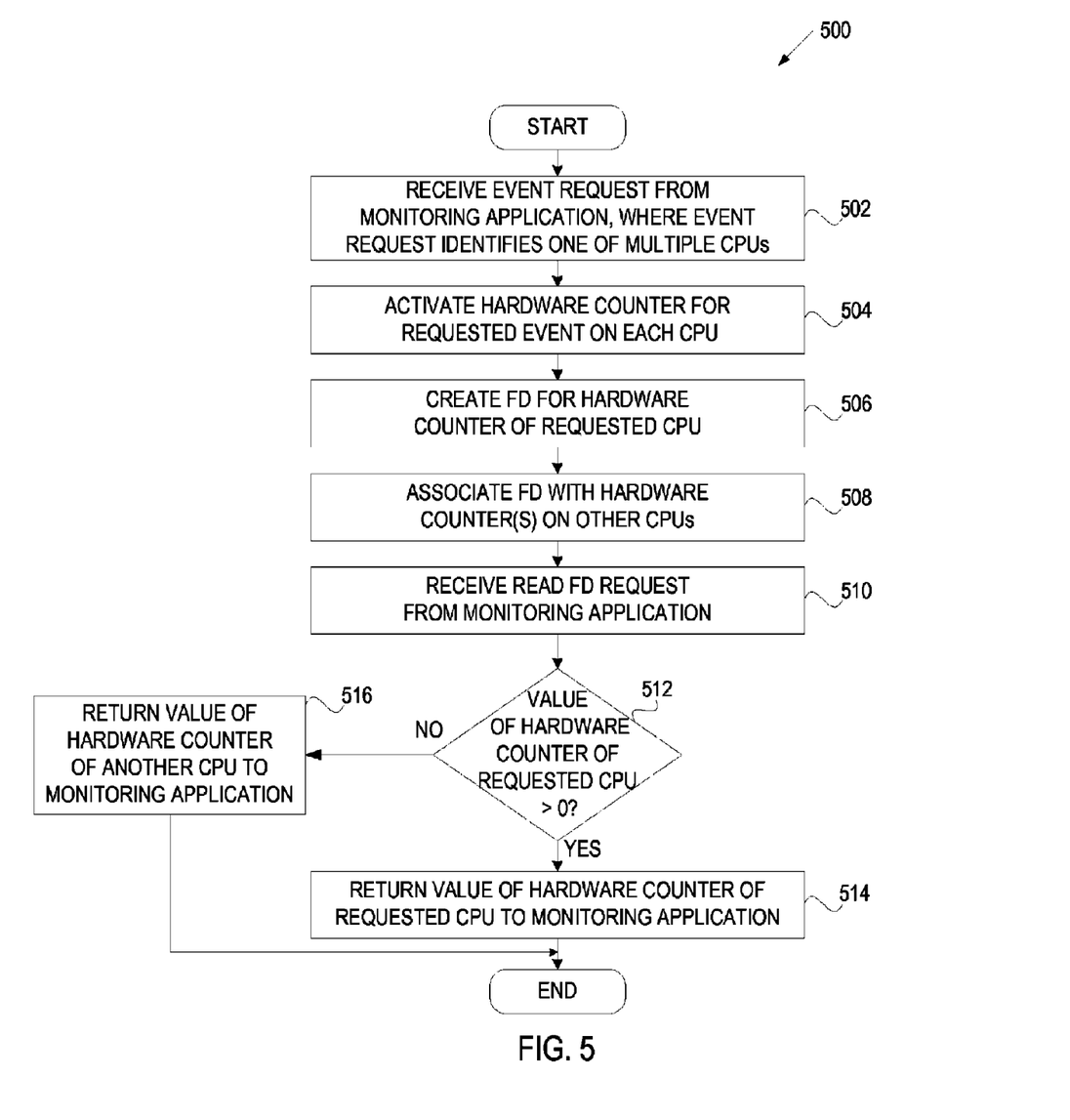
FIG. 5 is a flow diagram of one embodiment of a method for providing performance counters in a system having multiple CPUs.

FIG. 5 is a flow diagram of one embodiment of a method 500 for providing performance counters in a system having multiple CPUs. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by a kernel (e.g., kernel PCE subsystem 106 of FIG. 1A).

Referring to FIG. 5, method 500 begins with receiving an event request of a monitoring application. The event request identifies one of multiple CPUs to restrict a counter to a specific CPU. At block 504, processing logic activates a hardware counter for the requested event on each CPU to cover a possibly mistaken id of the CPU. At block 506, processing logic creates a file descriptor (FD) for a hardware counter of the requested CPU. At block 508, processing logic associates the FD with the hardware counter(s) on the other CPU(s).

At block 510, processing logic receives a read FD request from the monitoring application. At block 512, processing logic determines whether the value of the hardware counter of the requested CPU is greater than 0. If so, processing logic returns the value of the hardware counter of the requested CPU to the monitoring application (block 514). If not, processing logic selects the CPU that has the hardware counter greater than zero and returns the value of this hardware counter to the monitoring application (block 516).

Alternatively, if the initial request of the monitoring application asks for counting on all CPUs, processing logic activates a hardware counter for the requested event on each CPU, allocates a data field for a cumulative counter, and creates a file descriptor (FD) for the cumulative counter. Upon receiving a read FD request from the monitoring application, processing logic adds the values of all hardware counters to the cumulative counter, and provides the resulting cumulative counter value to the monitoring application.

Figure 6:
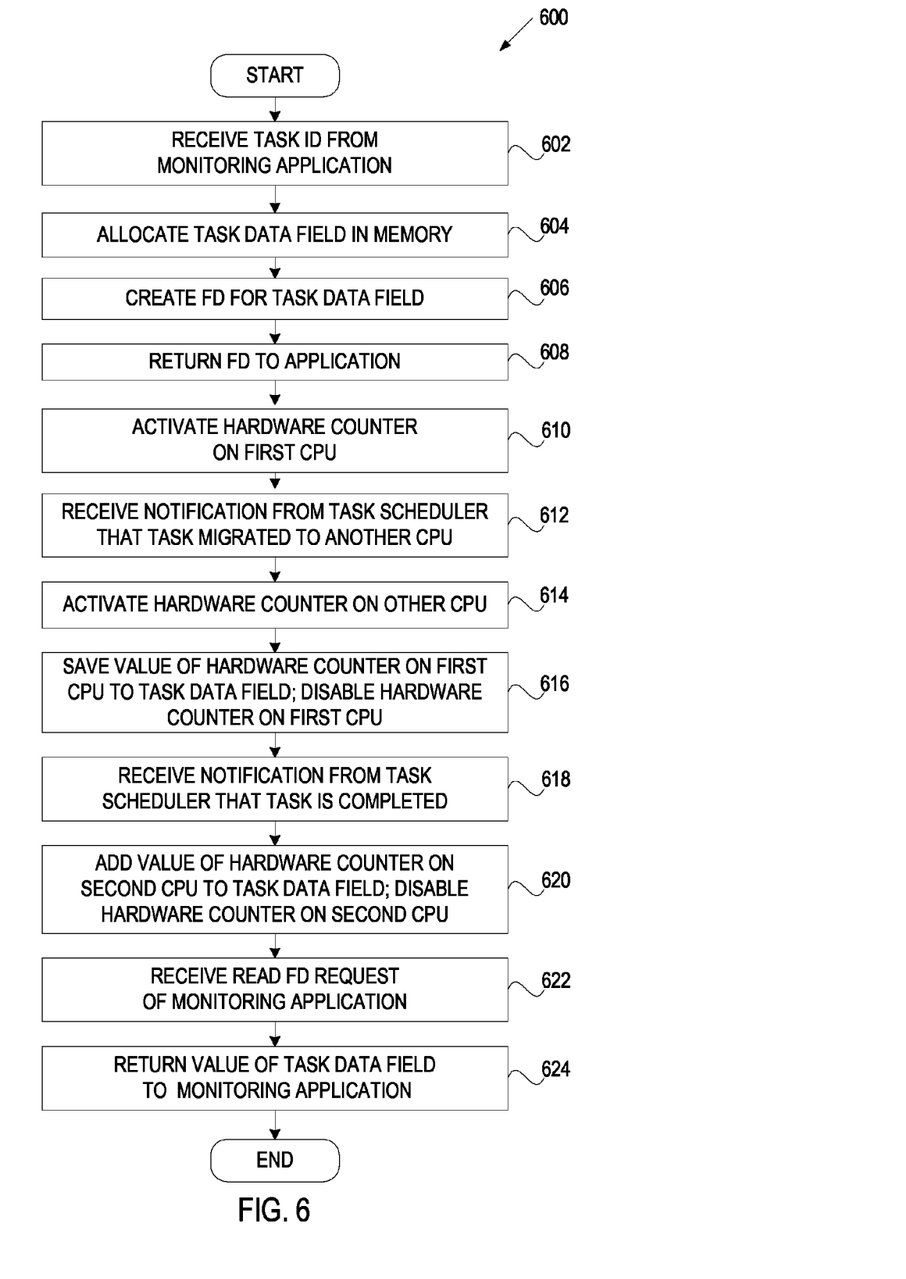
FIG. 6 is a flow diagram of one embodiment of a method for providing a counter for a specific task in a system having multiple CPUs.

FIG. 6 is a flow diagram of one embodiment of a method 600 for providing a counter for a specific task in a system having multiple CPUs. The method 600 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 600 is performed by a kernel (e.g., kernel PCE subsystem 106 of FIG. 1A).

Referring to FIG. 6, method 600 begins with receiving an event request of a monitoring application with a specific task ID and a CPU parameter indicating that the task should be monitored on all CPUs (block 602). At block 604, processing logic allocates a task data field in memory. At block 606, processing logic creates an FD for the task data field. At block 608, processing logic returns the FD to the monitoring application.

At block 610, processing logic receives a notification from a CPU scheduler of the kernel that the task has begun executing on a first CPU and activates a hardware counter on the first CPU. At block 612, processing logic receives a notification from the kernel's task scheduler that the task has migrated to another CPU. At block 614, processing logic activates the hardware counter on the second CPU. At block 616, processing logic saves the value of the hardware counter of the first CPU to the task data field and disables the hardware counter on the first CPU.

At block 618, processing logic receives a notification from the task scheduler that the task is complete. At block 620, processing logic adds value of the hardware counter on the second CPU to the task data field, and disables the hardware counter on the second CPU. At block 622, processing logic receives a read FD request of the monitoring application. At block 624, processing logic returns the value of the task data field to monitoring application.

In another embodiment, the specified task is executed on a single CPU but the CPU switches between the specified task (task-B) and another task (task-A), with task-B having a single counter (it opened a single FD via the system call) and task-B having no counters. In this embodiment, when the CPU switches from task-A to task-B, the PCE subsystem receives a notification from the CPU scheduler and activates a hardware counter corresponding to the FD. Task-B executes its timeslice for x milliseconds. Then, the CPU scheduler switches task-A in. The PCE subsystem detects the switch and deactivates the hardware counter corresponding to the FD. Task-A executes its timeslice for y milliseconds, after which the CPU scheduler switches task-B back in. The PCE subsystem detects the switch and activates the hardware counter corresponding to the FD. Task-B executes its timeslice for z milliseconds.

In the above example, the hardware counter of the CPU was enabled for x milliseconds, then it was disabled for y milliseconds, and then it was enabled again for z milliseconds. In one embodiment, the PCE subsystem allocates a data structure with counter objects that are active for any given task, and the kernel's task scheduler enables/disables the right counter object(s) for each task as the CPU switches between tasks. That is, a counter object keeps in ticking when its task runs, and does not change when its task does not run. The resulting cumulative value of the counter object corresponding to the FD is provided to the monitoring application when requested.

Figure 7:
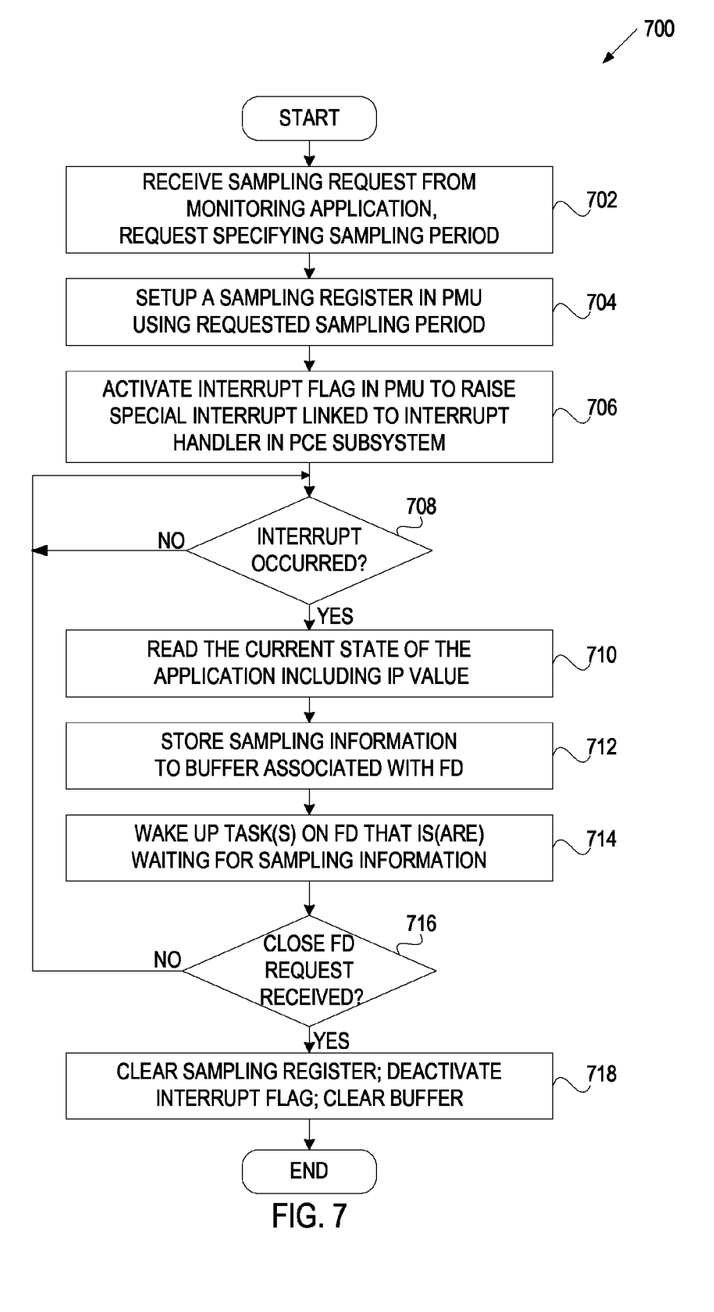
FIG. 7 is a flow diagram of one embodiment of a method for providing performance sampling information to a monitoring application.

FIG. 7 is a flow diagram of one embodiment of a method 700 for providing performance sampling information to a monitoring application. The method 700 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 700 is performed by a kernel (e.g., kernel PCE subsystem 106 of FIG. 1A).

Referring to FIG. 7, method 700 begins with receiving a sampling request of a monitoring application, where the sampling request specifies a sampling time period (block 702). At block 704, processing logic sets up a sampling register in the PMU using a requested sampling period. At block 706, processing logic activates an interrupt flag in the PMU to raise a special interrupt linked to an interrupt handler in the PCE subsystem. Processing logic then allocates a buffer, associates an FR with the buffer, and returns the FD to the monitoring application.

At block 708, processing logic determines whether an interrupt has occurred. If not, processing logic waits for the interrupt. Is so, processing logic reads the current state of the application, including an instruction pointer (IP) value (block 710). At block 712, processing logic stores resulting sampling information to the buffer associated with the FD. At block 714, processing logic wakes up task(s) on the FD that is(are) waiting for sampling information. At block 716, processing logic determines whether the closed FD request has been received. If not, processing logic returns to block 708. If so, processing logic clears the sampling register, deactivates the interrupt flag and clears the buffer.

An example of a sampling result is provided as follows:

| PerfTop: 227 irqs/sec kernel: 64.8% [1000 Hz cycles], (all, 16 CPUs) | | | |
|---|---|---|---|
| samples | pcnt | function | DSO |
| 48.00 | 10.6% | clear_page_c | [kernel.kallsyms] |
| 27.00 | 5.9% | _int_malloc | /lib64/libc-2.10.90.so |
| 13.00 | 2.9% | page_fault | [kernel.kallsyms] |
| 13.00 | 2.9% | get_page_from_freelist | [kernel.kallsyms] |
| 11.00 | 2.4% | copy_user_generic_string | [kernel.kallsyms] |
| 11.00 | 2.4% | kallsyms_expand_symbol | [kernel.kallsyms] |
| 10.00 | 2.2% | _GI_memset | /lib64/libc-2.10.90.so |
| 10.00 | 2.2% | _int_free | /lib64/libc-2.10.90.so |
| 9.00 | 2.0% | calloc | /lib64/libc-2.10.90.so |
| 8.00 | 1.8% | malloc_consolidate | /lib64/libc-2.10.90.so |
| 8.00 | 1.8% | _spin_lock | [kernel.kallsyms] |
| 7.00 | 1.5% | _strncmp_sse42 | /lib64/libc-2.10.90.so |
| 7.00 | 1.5% | _strlen_sse42 | /lib64/libc-2.10.90.so |
| 6.00 | 1.3% | prep_new_page | [kernel.kallsyms] |
| 6.00 | 1.3% | _GI_libc_malloc | /lib64/libc-2.10.90.so |
| 6.00 | 1.3% | hex2u64 | /bin/perf |
| 5.00 | 1.1% | _spin_lock_irqsave | [kernel.kallsyms] |
| 5.00 | 1.1% | do_anonymous_page | [kernel.kallsyms] |
| 5.00 | 1.1% | rb_next | /bin/perf |

In the above example, "cycles" were sampled with the result of 227 samples per seconds. The line "13.00 2.9% get_page_from_freelist [kernel.kallsyms]" shows that 13 samples (interrupts) were happening while the kernel was executing the get_page_from_freelist( ) function. High-overhead functions are shown at the top of this histogram, indicating the "hot spots" of execution.

Figure 8:
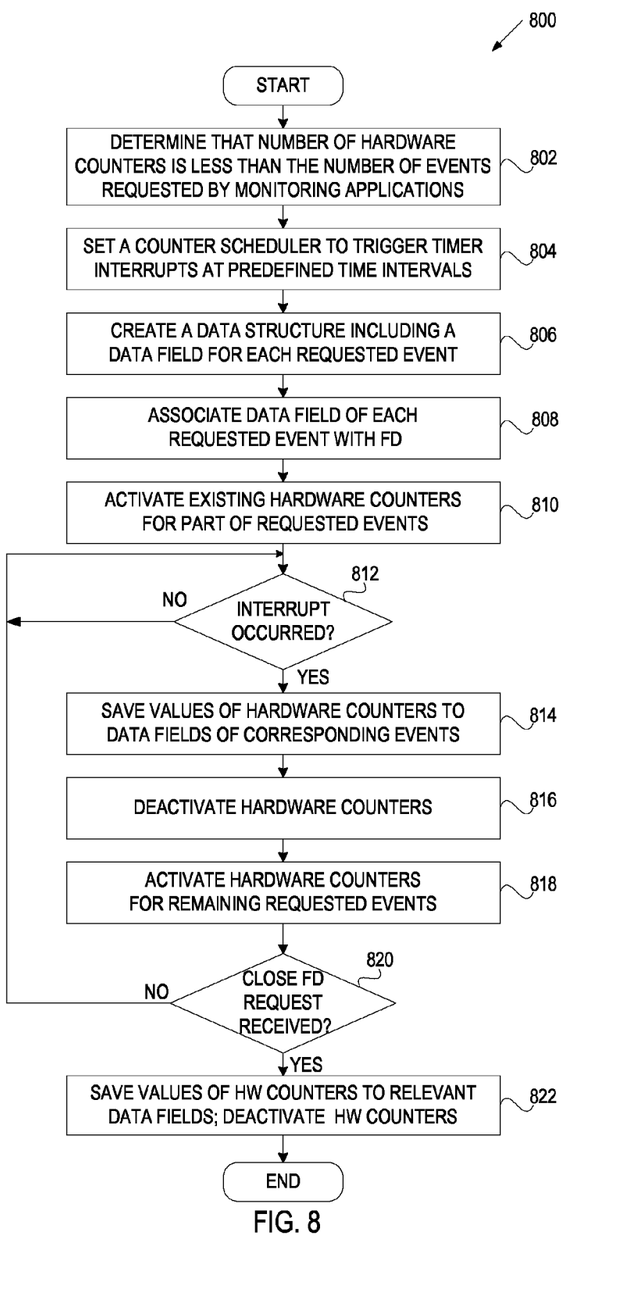
FIG. 8 is a flow diagram of one embodiment of a method for imitating an unlimited number of hardware counters.

FIG. 8 is a flow diagram of one embodiment of a method 800 for imitating an unlimited number of hardware counters. The method 800 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 800 is performed by a kernel (e.g., kernel PCE subsystem 106 of FIG. 1A).

Referring to FIG. 8, method 800 begins with determining that the number of hardware counters is less than the number of events requested by the monitoring application (block 802). At block 804, processing logic sets a counter scheduler to trigger timer interrupts at predefined time intervals. At block 806, processing logic creates a data structure including a data field for each requested event. At block 808, processing logic associates a data field of each requested event with an FD. At block 810, processing logic activates existing hardware counters for part of the requested events.

At block 812, processing logic determines whether an interrupt has occurred. If not, processing logic waits for the interrupt. Is so, processing logic saves the value of the hardware counters to corresponding data fields (block 814). At block 816, processing logic deactivates the hardware counters. At block 818, processing logic activates hardware counters for the remaining requested events. At block 820, processing logic determines whether a close FD request has been received. If not, processing logic returns to block 812. If so, processing logic saves the value of the hardware counters to corresponding data fields, deactivates the counter scheduler and deactivates the hardware counters.

Figure 9:
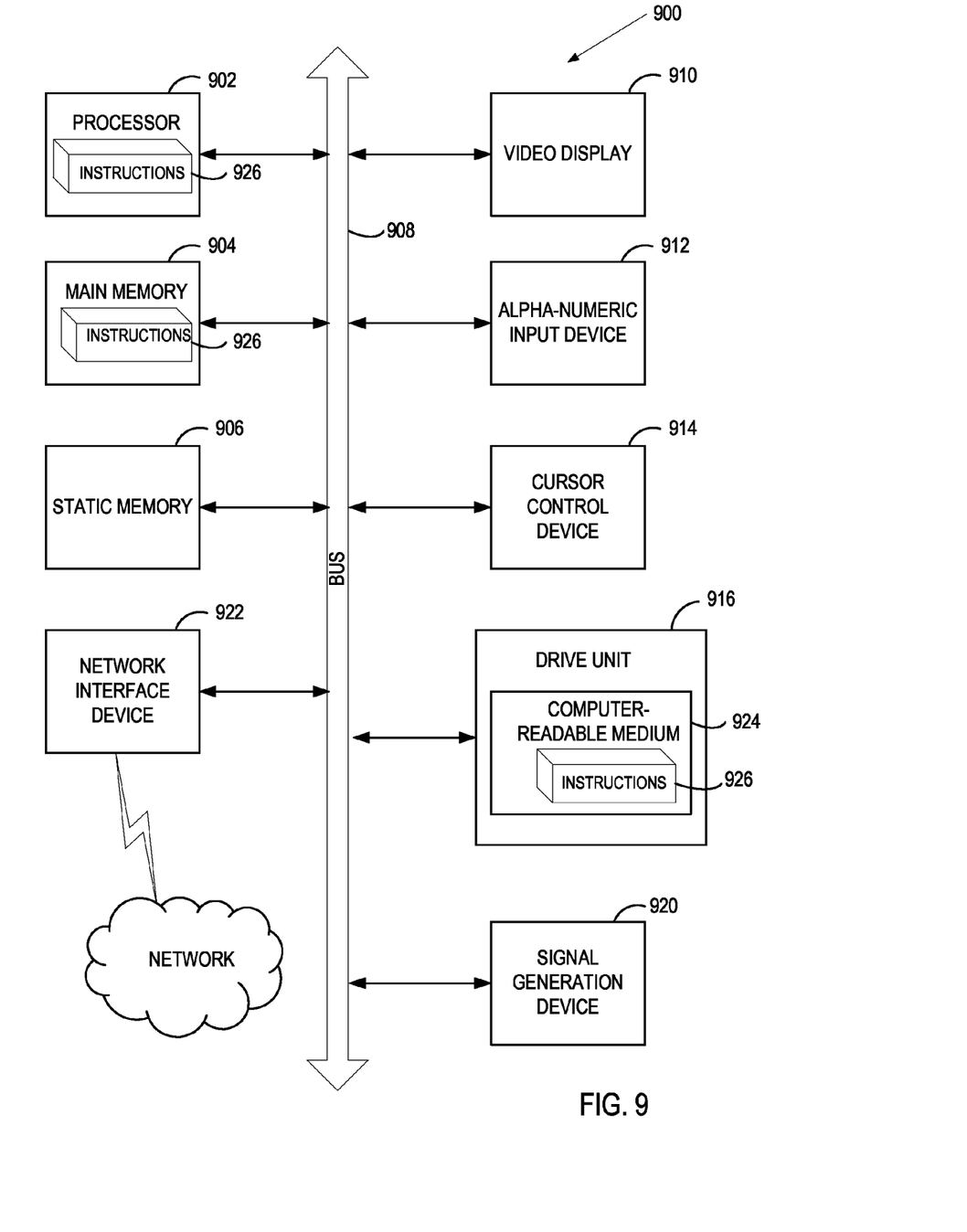
FIG. 9 is a block diagram of one embodiment of a computing system monitoring application performance.

FIG. 9 is a block diagram of one embodiment of a computing system monitoring application performance. Within the computing system 900 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computing system 900 includes one or more processing devices 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 916 (e.g., a data storage device in the form of a drive unit, which may include fixed or removable computer-readable storage medium), which communicate with each other via a bus 908.

Processing devices 902 represent one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute instructions 926 (e.g., PCE subsystem 106 and/or kernel interface module 112 of FIG. 1A) for performing the operations and steps discussed herein.

The computer system 900 may further include a network device 110 (e.g., NIC, Ethernet network card, etc.). The computer system 900 also may include a video display unit 910 (e.g., a liquid crystal display (LCD) or a cathode ray tube (CRT)) connected to the computer system through a graphics port and graphics chipset, an alphanumeric input device 912 (e.g., a keyboard), a cursor control device 914 (e.g., a mouse), and a signal generation device 920 (e.g., a speaker).

The secondary memory 916 may include a machine-readable storage medium (or more specifically a computer-readable storage medium) 924 on which is stored one or more sets of instructions (e.g., PCE subsystem 106 and/or kernel interface module 112 of FIG. 1A) embodying any one or more of the methodologies or functions described herein. The instructions 926 (e.g., zero copy transmission system 100 of FIG. 1A) may also reside, completely or at least partially, within the main memory 904 and/or within the processing device 902 during execution thereof by the computer system 900, the main memory 904 and the processing device 902 also constituting machine-readable storage media. The instructions 926 (e.g., PCE subsystem 106 and/or kernel interface module 112 of FIG. 1A) may further be transmitted or received over a network 918 via the network device 110.

The computer-readable storage medium 924 may also be used to store the instructions 926 (e.g., PCE subsystem 106 and/or kernel interface module 112 of FIG. 1A) persistently. While the computer-readable storage medium 926 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The components and other features described herein (for example in relation to FIG. 1A) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "creating," "returning," "providing" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for obtaining application performance data for different performance events via a unified channel has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
identifying, by a first application executed by a processing device of a computing system, an event type of event to be measured with respect to performance of a second application being monitored;
issuing, by the first application, a first virtual file system call comprising the identified event type as a parameter, wherein the first virtual file system call further comprises a task parameter identifying a task of the second application and a processor parameter, wherein the identified event type corresponds to a cumulative counter, and wherein the cumulative counter is a data field to aggregate a value of a first hardware counter for a first processor, and a value of a second hardware counter for a second processor;
receiving, by the first application, a file descriptor for the cumulative counter of the identified event type in response to the first virtual file system call and before the second application being monitored begins execution;
subsequent to receiving the file descriptor of the cumulative counter of the identified event type, causing, by the first application, the second application to begin the execution, wherein the first hardware counter is to perform measurements for the first processor with respect to the identified task during the execution of the second application based on performance characteristics of the second application for the identified event type, and the second hardware counter is to perform measurements for the second processor with respect to the identified task during the execution of the second application based on the performance characteristics of the second application for the identified event type;
determining, by the first application, the second application being monitored has completed execution;
after the execution of the second application is completed, issuing, by the first application, a second virtual file system call including the file descriptor for the cumulative counter of the identified event type as a parameter, wherein a value of the cumulative counter is an aggregation of the value of the first hardware counter and the value of the second hardware counter; and
receiving, by the first application, the value of the cumulative counter of the identified event type from an operating system in response to the second virtual file system call, wherein the second virtual file system call to obtain the value of the cumulative counter of the identified event type is performed without interrupting the execution of the second application.

2. The method of claim 1 wherein the second virtual file system call is a read virtual file system call specifying the file descriptor.

3. The method of claim 1 further comprising:
issuing a third virtual file system call to close the file descriptor; and
upon receiving the value of the cumulative counter corresponding to the event type, reporting the value of the cumulative counter.

4. The method of claim 1 wherein the event type is any one of a CPU cycle, a code instruction, a cache miss, a cache reference, a branch instruction, a branch miss, or a bus cycle.

5. The method of claim 1 wherein each of the first hardware counter and the second hardware counter is any one of a counting counter or a sampling counter.

6. The method of claim 5 wherein the sampling counter is associated with a sampling time period.

7. The method of claim 1 wherein the task parameter indicates any one of a current task, a specific task, or all tasks executed on the first and second processors.

8. The method of claim 1 wherein the processor parameter indicates the first processor and the second processor on the computing system.

9. A non-transitory computer readable storage medium including instructions that, when executed by a computing system, cause the computing system to perform a set of operations comprising:
identifying, by a first application executed by a processing device of the computing system, an event type of event to be measured with respect to performance of a second application being monitored;
issuing, by the first application, a first virtual file system call comprising the identified event type as a parameter, wherein the first virtual file system call further comprises a task parameter identifying a task of the second application and a processor parameter, wherein the identified event type corresponds to a cumulative counter, and wherein the cumulative counter is a data field to aggregate a value of associated with a first hardware counter for a first processor, and a value of a second hardware counter for a second processor;
receiving, by the first application, a file descriptor for the cumulative counter of the identified event type in response to the first virtual file system call and before the second application being monitored begins execution;
subsequent to receiving the file descriptor of the cumulative counter of the identified event type, causing, by the first application, the second application to begin the execution, wherein the first hardware counter is to perform measurements for the first processor with respect to the identified task during the execution of the second application based on performance characteristics of the second application for the identified event type, and the second hardware counter is to perform measurements for the second processor with respect to the identified task during the execution of the second application based on the performance characteristics of the second application for the identified event type;
determining, by the first application, the second application being monitored has completed execution;
after the execution of the second application is completed, issuing, by the first application, a second virtual file system call including the file descriptor for the cumulative counter of the identified event type as a parameter, wherein a value of the cumulative counter is based on an aggregation of the value of the first hardware counter and the value of the second hardware counter; and receiving, by the first application, the value of the cumulative counter of the identified event type from an operating system in response to the second virtual file system call, wherein the second virtual file system call to obtain the value of the cumulative counter of the identified event type is performed without interrupting the execution of the second application.

10. The computer readable storage medium of claim 9 wherein:

the second system call is a virtual file read system call specifying the file descriptor.

11. The computer readable storage medium of claim 9 wherein the event type is any one of a CPU cycle, a code instruction, a cache reference, a cache miss, a branch instruction, a branch miss, or a bus cycle.

12. The computer readable storage medium of claim 9 wherein each of the first hardware counter and the second hardware counter is any one of a counting counter or a sampling counter.

13. The computer readable storage medium of claim 12 wherein the sampling counter is associated with a sampling time period.

14. The computer readable storage medium of claim 9 wherein the processor parameter indicates the first processor and the second processor on the computing system.

15. A system comprising:
a memory;
processors coupled to the memory; and
a first application, executed from the memory by the processors, to:
identify an event type of event to be measured with respect to performance of a second application being monitored;
issue a first virtual file system call comprising the identified event type as a parameter, wherein the first virtual file system call further comprises a task parameter identifying a task of the second application and a processor parameter, wherein the identified event type corresponds to a cumulative counter, and wherein the cumulative counter is a data field to aggregate a value of associated with a first hardware counter for a first processor, and a value of a second hardware counter for a second processor;
receive a file descriptor for the cumulative counter of the identified event type in response to the first virtual file system call and before the second application being monitored begins execution;
subsequent to receiving the file descriptor of the cumulative counter of the identified event type, cause, by the first application, the second application to begin the execution, wherein the first hardware counter is to perform measurements for the first processor with respect to the identified task during the execution of the second application based on performance characteristics of the second application for the identified event type, and the second hardware counter is to perform measurements for the second processor with respect to the identified task during the execution of the second application based on the performance characteristics of the second application for the identified event type;
determine, by the first application, the second application being monitored has completed execution;
after the execution of the second application is completed, issue a second virtual file system call including the file descriptor for the cumulative counter of the identified event type as a parameter, wherein a value of the cumulative counter is based on an aggregation of the value of the first hardware counter and the value of the second hardware counter; and
receive the value of the cumulative counter of the identified event type from an operating system in response to the second virtual file system call, wherein the second virtual file system call to obtain the value of the cumulative counter of the identified event type is performed without interrupting the execution of the second application.

16. The system of claim 15 wherein:
the second virtual file system call is a read system call specifying the file descriptor.

17. The system of claim 15 wherein each of the first and second hardware counters is any one of a counting counter or a sampling counter.

18. The system of claim 15 wherein the processor parameter indicates the first processor and the second processor on the computing system.

* * * * *